(12) United States Patent
Bartley (10) Patent No.: US 12,531,399 B2
(45) Date of Patent: Jan. 20, 2026

(54) QUICK-CONNECT ATTACHMENT DEVICE FOR CUTTING CABLE CLADDING

(71) Applicant: Michael Steven Bartley, San Clemente, CA (US)

(72) Inventor: Michael Steven Bartley, San Clemente, CA (US)

( * ) Notice: Subject to any disclaimer, the term of this patent is extended or adjusted under 35 U.S.C. 154(b) by 125 days.

(21) Appl. No.: 18/741,462

(22) Filed: Jun. 12, 2024

(65) Prior Publication Data

US 2025/0385497 A1 Dec. 18, 2025

(51) Int. Cl.
  *H02G 1/12* (2006.01)
  *B23D 45/00* (2006.01)
  *B23D 45/16* (2006.01)
  *B25F 3/00* (2006.01)

(52) U.S. Cl.
  CPC ......... *H02G 1/1297* (2013.01); *B23D 45/003* (2013.01); *B23D 45/16* (2013.01); *B25F 3/00* (2013.01)

(58) Field of Classification Search
  CPC .... H02G 1/1297; B23D 45/003; B23D 45/16; B25F 3/00
  See application file for complete search history.

(56) References Cited

U.S. PATENT DOCUMENTS

| | | | |
|---|---|---|---|
| 4,142,290 A * | 3/1979 | Ducret | H02G 1/1297 30/90.9 |
| 10,033,167 B1 * | 7/2018 | DeVita | H02G 1/1297 |
| 10,978,860 B1 * | 4/2021 | Wendt | B23D 45/003 |
| 2005/0066528 A1 * | 3/2005 | Ducret | H02G 1/1297 30/90.1 |
| 2008/0047147 A1 * | 2/2008 | Ducret | H02G 1/1297 30/90.4 |
| 2012/0174411 A1 * | 7/2012 | Ducret | H02G 1/1297 30/91.1 |
| 2015/0364905 A1 * | 12/2015 | Fehrman | H02G 1/1297 225/103 |
| 2019/0245332 A1 * | 8/2019 | Jackson | H02G 1/16 |
| 2020/0373745 A1 * | 11/2020 | Galindo Gonzalez | H02G 1/1297 |
| 2021/0327613 A1 * | 10/2021 | Atif | H01R 43/28 |
| 2022/0123535 A1 * | 4/2022 | Eisele | H02G 1/1297 |
| 2022/0143855 A1 * | 5/2022 | Barnes | B26B 27/00 |
| 2022/0231490 A1 * | 7/2022 | Rosa | B21F 13/00 |
| 2022/0399693 A1 * | 12/2022 | Sorg | H02G 1/1297 |

* cited by examiner

*Primary Examiner* — Omar Flores Sanchez
(74) *Attorney, Agent, or Firm* — Plager Schack LLP; Mark H. Plager; Kara K. Verryt

(57) ABSTRACT

A compact, portable device is attachable to an impact driver or drill motor to cut electrical cable metal cladding without damage to conductors thereunder when used properly. The device comprises a cross member, a housing, an intermediary component held under tension in the housing, and a small saw blade. An electrical cable may be held in an intermediary component cable channel by a pair of spring pins extending downwardly from the cross member into the channel in response to downward manual pressure to the cross member by a user. The intermediary component and the housing are configured to permit vertical sliding movement of the saw blade in response to application of upward manual pressure to the housing by a user. As the bottom of the tool is compressed manually, a portion of the saw blade is permitted to enter the channel through a channel bottom slit to cut the cladding.

10 Claims, 5 Drawing Sheets

QUICK-CONNECT ATTACHMENT DEVICE FOR CUTTING CABLE CLADDING

FIELD OF THE INVENTION

The present invention is related generally to hand tools, and more particularly, to impact driver/drill motor-operated hand tools involving the use of rotating saw blades, and even more particularly to a quick-connect attachment device for cutting cable cladding.

BACKGROUND OF THE INVENTION

In the general electrical field, cables such as BX, and MC cables have cable cladding that is difficult to cut due to its protective metallic-armored layer. In the process of cutting cable cladding, due diligence and great care must be exercised to ensure that no harm befalls the underlying conductors below.

Some solutions currently available for cutting cable cladding require a large hand crank, which due to its size and unwieldiness, takes a long time to use to complete the task of cutting cable cladding. Other currently available tools are large, bulky and heavy. Cutting cable cladding with conventional cutters increases the likelihood of damage to the wire below, and the likeliness of injury to the electricians.

The lack of effective solutions also results in a risk of injury to a worker trying to accomplish this difficult task.

A need exists for a solution one or more of these problems. A solution is needed which enables a worker to quickly, easily, efficiently, accurately and proficiently complete the task of cutting armored cable cladding which may be used to not only decrease or eliminate the risk of damage to the conductors within or beneath the armored cladding, but also reduce the risk of injury to the worker. A further need exists for an attachment which may be quickly installed on an existing power tool to provide these benefits, and further may be used to stabilize the armored cladding while it is being cut, to limit the exposure of a cutting blade, and to limit the depth of a blade cut to prevent contacting or damage to the conductors.

SUMMARY OF THE INVENTION

The present invention provides impact driver/drill motor-assisted hand tools involving the use of rotating saw blades. Some embodiments of the present disclosure include a compact, portable hand tool attachment device which may be attached to an impact driver, a drill motor or any suitable driver tool for the purpose of cutting the metal cladding of an electrical cable. The present invention provides the ability to accurately cut cable cladding of an electrical cable while leaving the conductors below unharmed. The present invention differs from previous solutions due to its unique mechanisms and its small, compact size. The invention further distinguishes over previous solutions which require a large hand crank and provides an unprecedented configuration for use with impact drivers, drill motors and other suitable drivers to cut cable cladding.

In one implementation, the present invention provides a quick-connect attachment device for cutting cable cladding of an electrical cable without damaging the electrical wires beneath the metal cladding, when used properly. The device has a top and a bottom, and comprises a cross member, an intermediary component, a housing, a saw blade, a device bearing and a quick-connect shaft. A portion of the intermediary component is configured to be encased and held under tension in a portion of the housing, by a housing mating component comprising a pair of oval shaped slots of the intermediary component shaped to mate with a pair of interior housing protrusions. The intermediary component comprises a channel (cable channel) configured to receive an electrical cable, such as a BX cable, an MC cable or an AC cable. The channel has a channel top and a channel bottom. The electrical cable may be inserted in the cable channel of the intermediary component while the encased portion of the intermediary component is secured under spring tension in the housing, allowing for vertical sliding movement upon application of manual pressure to a bottom of the device (a housing base) by a user. As the bottom of the device is compressed manually, a fraction of the saw blade enters the channel at the channel bottom. The quick connect shaft may comprise a distal quick-release chuck which may be securely removably attached to an impact driver, drill motor or any suitable driver tool. The quick connect shaft passes through a penetration of the device and a proximal end thereof is secured to the saw blade, which is configured to rotate on the device bearing, when engaged. Two spring-loaded pins may be encased inside the top channel and attached to a cross member. In response to the application of manual pressure to the cross member, the cross member drives the pins into the channel, fastening and stabilizing the cable so the saw blade may cut the metal cladding without damaging electrical wires thereunder.

In one aspect, the present invention provides a portable compact device configured for attachment to an impact driver, a drill motor or any suitable driver tools for the purpose of cutting the metal cladding of an electrical cable. The device may comprise a cross member, an intermediary component having a lower portion and an upper portion, a housing, a saw blade rotatably mounted on a bearing located in the intermediary component lower portion, and a quick-connect shaft operably connected to the bearing, the quick-connect shaft having a proximal end and a distal end. The intermediary component lower portion is configured to be retained in the housing under tension, and intermediary component upper portion comprises a channel configured to receive an electrical cable, such as BX, MC, AC or the like, the channel further comprising a channel top and a channel bottom.

The housing encases the intermediary component lower portion. The housing is spring biased with respect to the intermediary component lower portion. The device further comprises a pair of interior housing springs configured to extend between an interior surface of the housing base and two spring-receiving cavities provided in a lower surface of the intermediary component. The interior housing springs maintain a constant spring tension between the housing and the intermediary component.

The housing comprises a pair of interior housing protrusions configured to engage with oval-shaped slots in a mating component of the intermediary component lower portion, the interior housing protrusions further being configured to allow vertical movement of the intermediary component lower portion in response to the application of upward manual pressure to a lower surface of the housing.

The constant spring tension provided by the interior housing springs further maintains alignment of the pair of interior housing protrusions and the pair of oval-shaped slots of the intermediary component.

In response to manual compression of the housing, a portion or a fraction of the saw blade enters the channel bottom. The quick connect distal end is attachable to the driver tool, and the quick connect proximal end is secured to the small saw blade rotatably mounted on the bearing, the bearing and saw blade thereby being configured to rotate in response to operation of the driving tool. Two spring-loaded pins extend downwardly from a lower surface of the cross member into the channel top, which in response to the manual application of downward pressure drive the pins into the channel, fastening and stabilizing the cable.

In use, to operate the device, an impact drill, a drill motor or any driver tool is attached to the quick connect shaft. Then a cable, such as MC or BX, is inserted into the channel and secured by applying manual pressure to the cross member; driving the dual pins into the channel. Manual pressure is also applied to the bottom of the device, resulting in a small part of the saw blade being exposed into the channel where the cable is being held. A brief press and release of the trigger of the impact drill or drill motor results in the process of the saw blade rotating and cutting the metal cladding away from the wires beneath.

The device of the present invention enables a user to accurately complete the task of cutting the cladding in a fast and proficient manner. When operating the device, spring loaded dual pins are compressed into the armored cladding to safeguard the cable from moving during operation of the device. When the device is at rest, the small saw blade remains concealed to reduce risk of injury. When the device is used properly, in response to the application of manual pressure to the housing, the fraction of the saw blade necessary to cut only the cladding will be exposed to cut the cable cladding, leaving the electrical conductors beneath unharmed. An impact driver or drill motor is attached to the quick connect part of the shaft that rotates and cuts the cable cladding without having to use a hand crank to rotate the blade manually.

BRIEF DESCRIPTION OF THE FIGURES

The detailed description of some embodiments of the invention is made below with reference to the accompanying figures, wherein like numerals represent corresponding parts of the figures.

FIG. 6 provides a side view of the invention in the second position of use;

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as to a quick-connect attachment device for cutting cable cladding and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the device of the present disclosure may be related in the following exemplary fashion. It is not intended to limit the scope or nature of the relationships between the various elements and the following examples are presented as illustrative examples only.

By way of example, and referring to FIGS. 1-10, some embodiments of the present disclosure include a quick-connect attachment device (hereinafter device 10) configured for attachment to a driver 30 (best seen at FIG. 3), also referred to as driver tool 30, for use to cut metal cladding 28. Nonlimiting examples of a driver tool 30 may include an impact driver, a drill motor or any suitable commercially available driver tool. When used properly, the device 10 may be used to cut a metal cladding 28B of an electrical cable 28 without damaging any electrical wire 28A of the electrical cable 28 located beneath the metal cladding 28B.

The device 10 comprises a cross member 20, a housing 12, an intermediary component 14, a saw blade 26, a bearing 32, and a quick connect shaft 18.

The cross member 20 has a cross member upper surface and a cross member lower surface. The cross member 20 further comprises a pair of pins 22A, which further comprise a first pin extending downwardly from the cross member lower surface and a second pin extending downwardly from the cross member lower surface.

The housing 12 comprises a housing body having a housing base 12A, at least one side wall, and a housing interior. In some embodiments, the at least one side wall may comprise a right side wall, a left side wall and a front side wall. In some embodiments, the housing 12 may include a removable rear cover member 40 fastened to the housing 12 by threaded screws located at each corner of the cover member 40.

The intermediary component 14 has an intermediary component lower portion 14A and an intermediary component upper portion 14B. The intermediary component lower portion 14A is constructed and arranged to mate with the housing 12. The intermediary component lower portion 14A further comprises an intermediary component lower portion surface, further comprising an intermediary component bottom surface and an intermediary component side surface. A pair of oval-shaped slots 34A is located in the intermediary component side surface. The pair of oval-shaped slots 34A is configured to mate with a pair of interior housing protrusions 34B to retain the intermediary component 14 in the housing 12. An intermediary component tread 14C is located in the intermediary component 14.

The intermediary component upper portion 14B has an intermediary component top surface. The intermediary component upper portion 14B comprises an axial cable channel 16 configured to receive an electrical cable 28. The cable channel 16 has a C-shaped cross section. The cable channel 16 comprises a cable channel top, a cable channel bottom and a cable channel bottom slit 24. A first transverse cylindrical pin channel and a second transverse cylindrical pin channel 16A (best seen at FIG. 8) extend downwardly from the intermediary component top surface through the cable channel top of the cable channel 16.

The cross member 20 is spring mounted to the cable channel top. The first pin and the second pin 22A are respectively mounted and spring loaded in the first pin channel and the second pin channel 16A, for reciprocating movement of the cross member 20 in response to manual downward pressure applied to the upper surface of the cross member 20.

Figure 1:
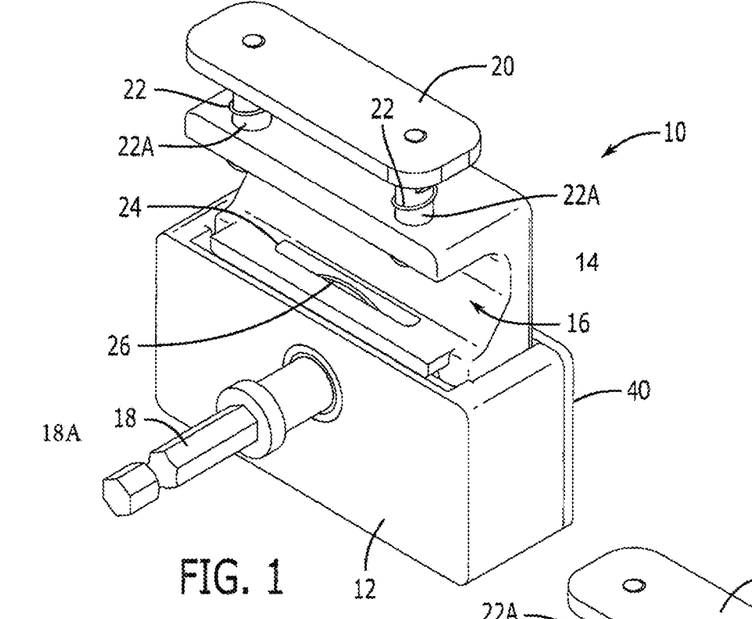
FIG. 1 provides a top front perspective view of the quick-connect attachment device for cutting cable cladding in accordance with an embodiment of the present invention.
Figure 2:
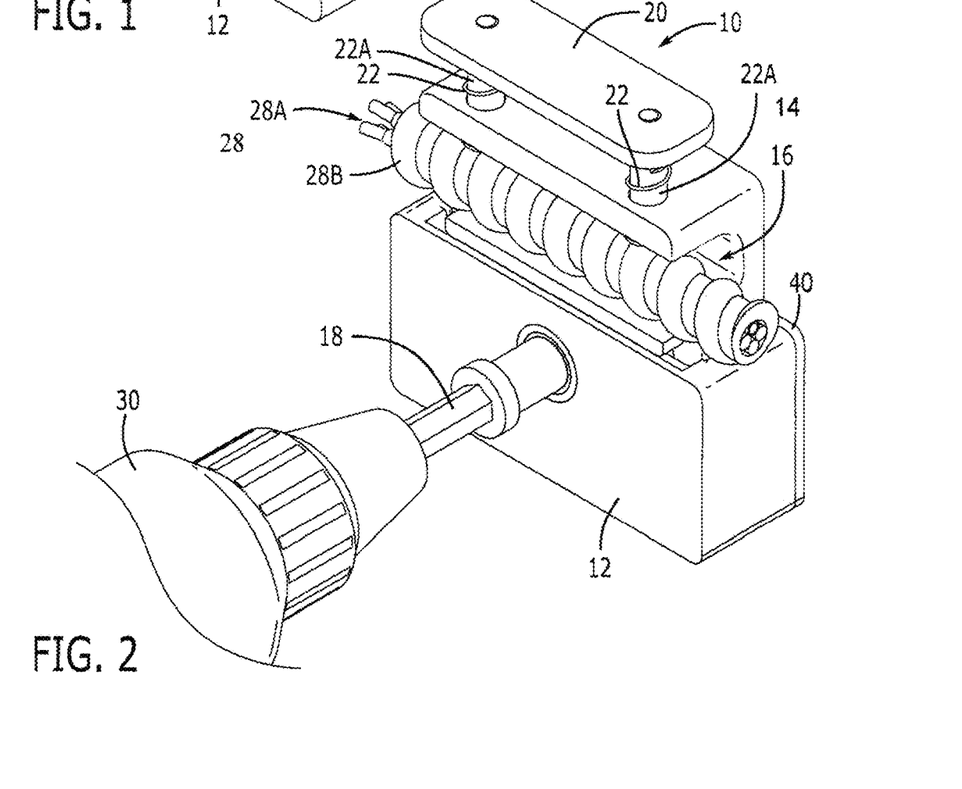
FIG. 2 provides a top front perspective view as in FIG. 1, showing the electrical cable positioned therein.
Figure 9:
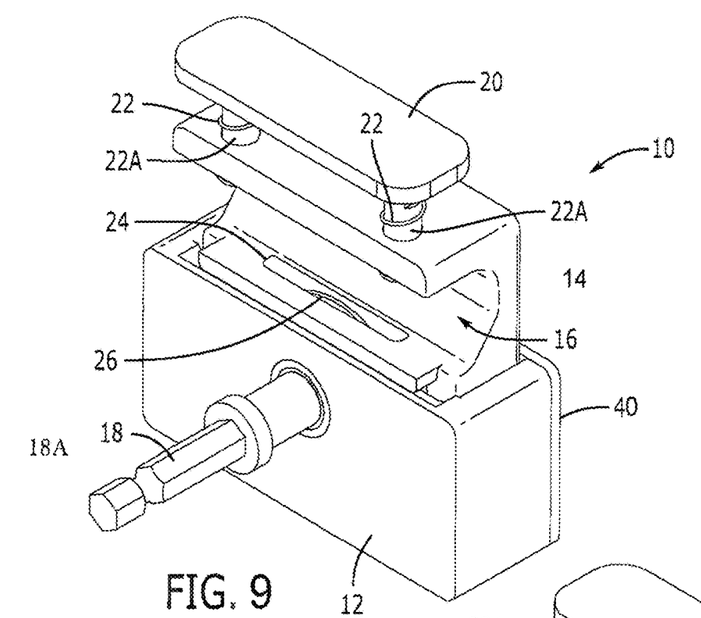
FIG. 9 provides a top front perspective view of the quick-connect attachment device for cutting cable cladding in accordance with an embodiment of the present invention.
Figure 10:
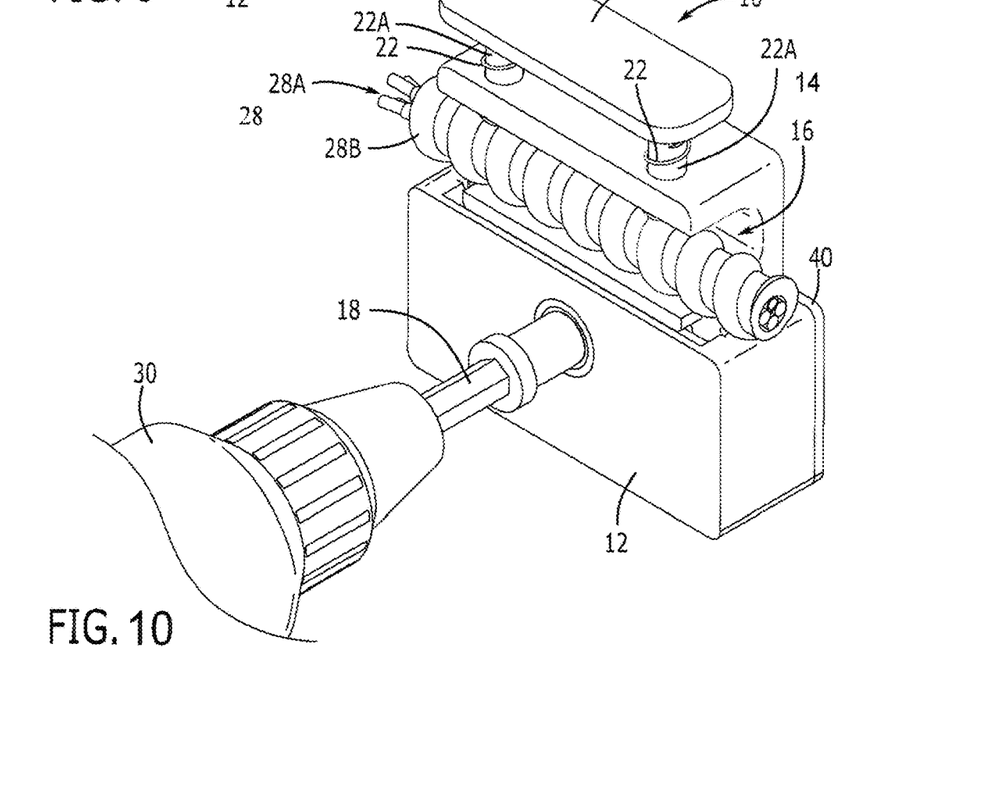
FIG. 10 provides a top front perspective view as in FIG. 9 showing the electrical cable positioned therein.

In some embodiments, the first pin and the second pin 22A may be attached to the cross member 20 by any suitable attachment means. A nonlimiting example of an attachment means may include a threaded attachment means as shown at FIGS. 1-2. As shown at FIGS. 9-10, in some embodiments the first and second pins 22A may comprise pegs, which may be attached to the cross member by a friction fit, an interference fit, an adhesive, or the like, or the first pin and the second pin 22A may be integrally formed with the cross member 20 as a unitary piece.

Figure 5:
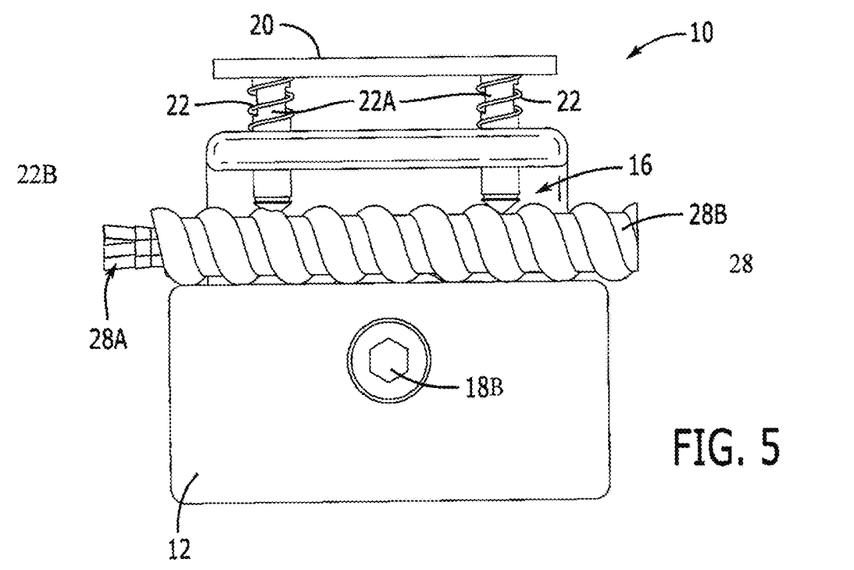
FIG. 5 provides a front view of the invention in the second position of use.
Figure 6:
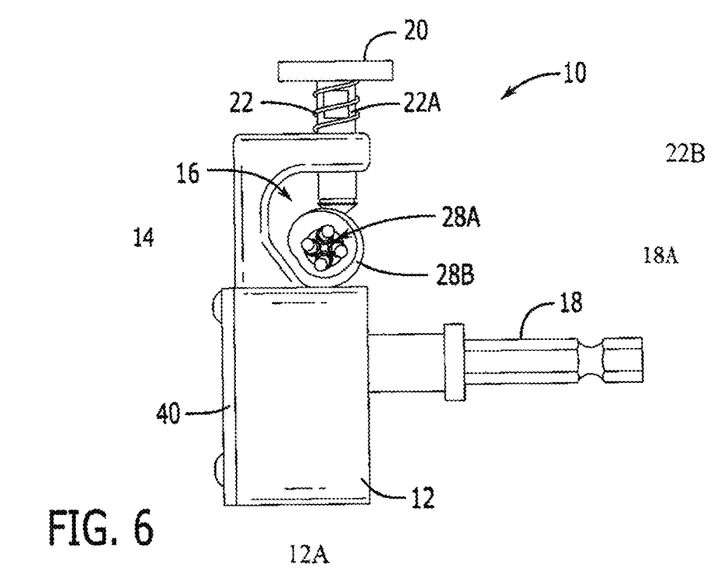

The first pin and the second pin 22A each further comprise a distal pin tip 22B constructed and arranged to contact the exterior surface of the electrical cable 28 located in the cable channel 16 when manual pressure is applied to the cross member 20 (best seen at FIGS. 5-6).

Figure 3:
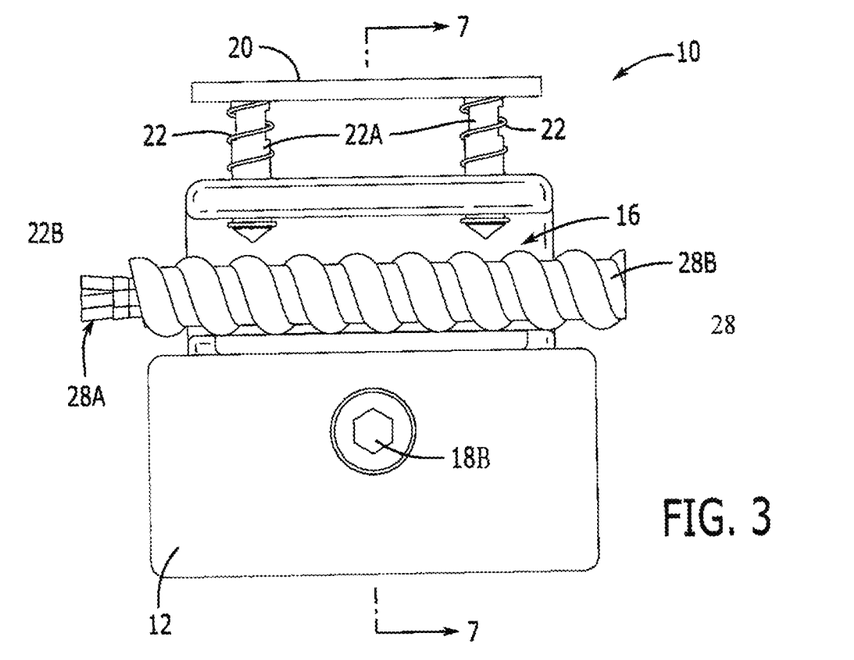
FIG. 3 provides a front view of the invention in the first position of use.
Figure 4:
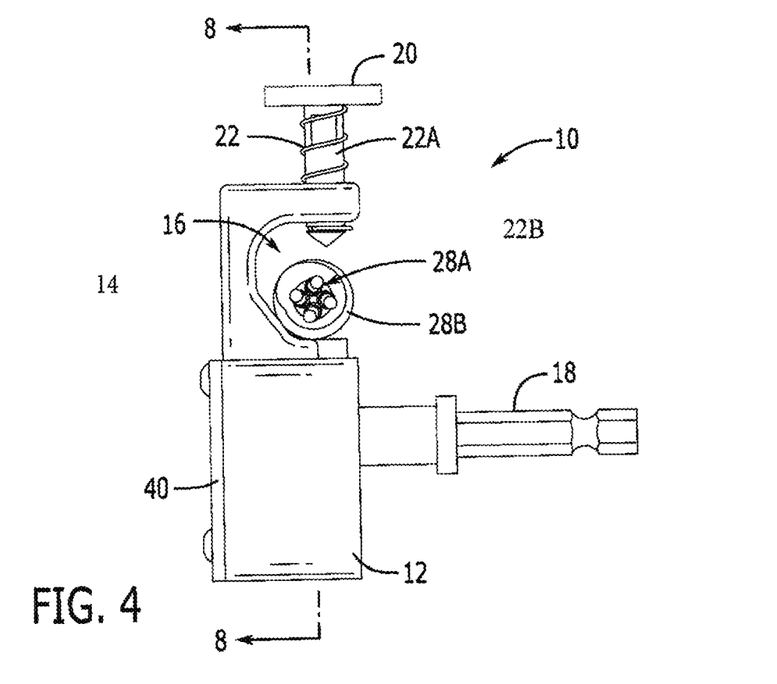
FIG. 4 provides a side view of the invention in the first position of use.

In some embodiments, the pair of pins 22A may comprise first and second spring-loaded pins configured to be encased in the first and second pin channels 16A. The pins 22A may be maintained under tension by the springs 22 which assert an upward force on the cross member lower surface and the pins 22A located in the first and second pin channels (as shown at FIGS. 3 and 4). In use, when the device 10 is in a clamped position, when manual pressure is applied to the cross-member 20, the distal pin tips 22B drive down into the cable channel 16, securing and immobilizing the electrical cable 28.

The saw blade 26 is rotatably mounted on a bearing 32 (best seen at FIG. 7) operably connected to the intermediary component tread 14C in the housing 12 and configured for movement in the intermediary component lower portion 14A for access to the metal cladding 28B of the electrical cable 28 located in the cable channel 16 through the cable channel bottom slit 24.

The quick-connect shaft 18 is removably mounted to the housing 12. The quick-connect shaft 18 is operably connected to the intermediary component tread 14C and the saw blade 26. The quick-connect shaft 18 is configured for secure removable attachment of the device 10 or connection of the device 10 to a driver tool 30. In use, the device 10 may be securely removably attached to the driver tool 30 by the quick-connect shaft 18 for use to cut through the metal cladding 28B.

In response to the application of manual pressure to the cross member 20, the cross member 20 drives the first pin and the second pin 22A through the first pin channel and the second pin channel 16A (best seen at FIG. 7) so the first pin and second pin 22A abut or contact the exterior surface of the electrical cable 28 to retain and immobilize the electrical cable 28 in the cable channel 16.

The saw blade 26 is capable of being selectively actuated by a user by operating the driver tool 30 to cut through the metal cladding 28B of the electrical cable 28 a predetermined depth equal to a thickness of the metal cladding 28B.

When the device 10 is used properly, the metal cladding may be cut without damaging any electrical wires 28A thereunder.

The housing 12 may be spring biased with respect to the intermediary component lower portion 14A. The device 10 may further comprise a pair of interior housing springs 42 (best seen at FIGS. 7 and 8) configured to extend between an interior surface of the housing base 12A and a lower surface of the intermediary component 14. The interior housing springs 42 are configured to maintain a constant spring tension between the housing 12 and the intermediary component 14. In some embodiments, the intermediary component 14 may further comprise a pair of spring receiving cavities configured to receive the interior housing springs. In other embodiments, the interior housing springs 42 may be mounted to the interior of the housing base 12A, to the lower surface of the intermediary component or to both the interior of the housing base 12A and the lower surface of the intermediary component. The constant spring tension provided by the interior housing springs 42 further maintains alignment of the pair of interior housing protrusions 34B and the pair of oval-shaped slots 34A of the intermediary component 14.

The pair of oval-shaped slots 34A of the intermediary component lower portion 14A are constructed and arranged to permit vertical movement of the pair of interior housing protrusions 34B therein, thereby permitting vertical movement of the housing 12 relative to the intermediary component lower portion 14A in response to compression of the pair of interior housing springs 42 by applying manual pressure to the base of the housing 12. The vertical movement of the housing is limited by the movement of the pair of interior housing protrusions 34B in the pair of oval-shaped slots 34A.

The saw blade 26 is configured to be rotatably mounted on the bearing 32. In some embodiments, the saw blade 26 may be rotatably mounted on the bearing 32 by a saw blade shaft configured to rotate on the bearing. The saw blade 26 is operably connected to the quick-connect shaft 18 which is operably connected to the driver 30 (impact driver, drill motor or the like) by the quick-release chuck 18A.

Figure 7:
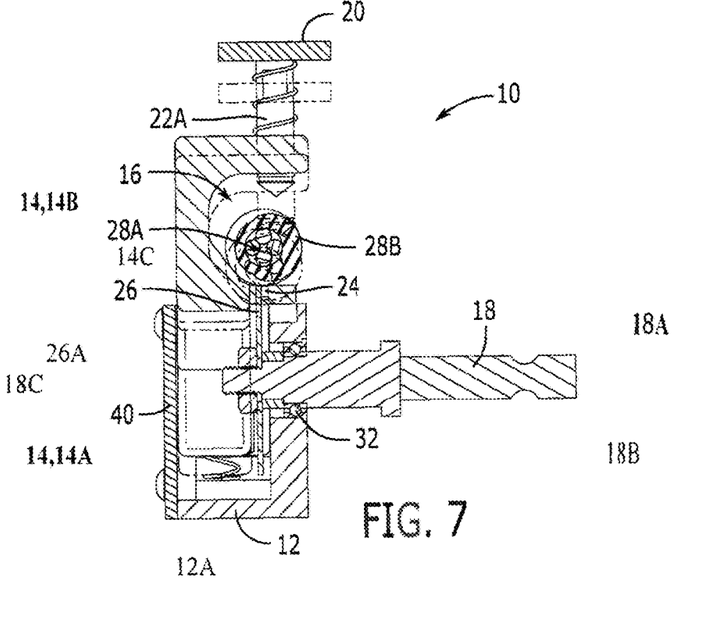
FIG. 7 provides is a cross-sectional view taken along line 7-7 of FIG. 3.
Figure 8:
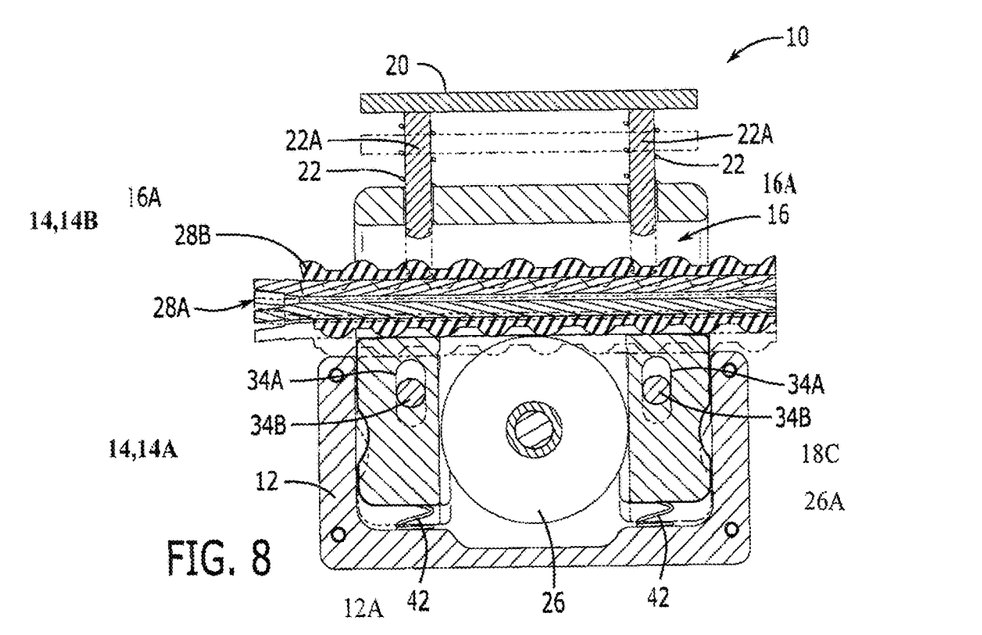
FIG. 8 provides a cross-sectional view taken along line 8-8 of FIG. 3.

With reference to FIGS. 7-8, the saw blade 26 is secured to a threaded end 18C of the shaft 18, by a threaded nut 26A. The shaft 18 extends through the center of the bearing 32 which is attached to the housing 12. The shaft 18 and the quick-release chuck 18A may be quickly connected to a driver tool 30, such as an impact driver (or fastened to a drill motor) for use of the device 10.

When the device is not in use, the saw blade 26 is located within the intermediary component lower portion 14A. The saw blade 26 must be selectively actuated to cut the metal cladding 28B of the electrical cable 28.

The saw blade 26 may be selectively actuated by applying manual pressure to the housing base 12A, which causes the pair of interior housing protrusions 34B to vertically slide in the pair of oval-shaped slots 34A of the intermediary component 14. The manual pressure applied to the housing base 12A will also compress the pair of interior housing springs 42 in order to advance the saw blade 26 from a saw blade lower position in which the saw blade 26 is located within the intermediary component lower portion 14A to a saw blade raised position in which a portion of the saw blade 26 is exposed through the cable channel bottom slit 24, enabling the device 10 to cut the metal cladding 28B.

The portion of the saw blade 26 exposed in the second raised position has a dimension less than or equal to the thickness of the metal cladding 28B so that the saw blade 26 may be actuated by a brief press and release of a trigger of the impact drill or the drill motor 30, resulting in rotation of the saw blade 26 and cutting of the metal cladding 28B. When the device 10 is used properly, the metal cladding 28B may be cut without damaging any electrical wires 28A therebeneath. The device of the present invention thereby enables a user to safely and accurately cut cable cladding of an electrical cable while leaving the conductors below unharmed, to separate the metal cladding from the electrical cable.

To access the saw blade 26 for replacement, the rear cover plate 40 may be removed by unscrewing four threaded corner screws that fasten the cover plate 40 to the housing 12 and then loosening the nut 26A that holds the blade 26 against the intermediary component tread 14C of the intermediary component 14 and sliding the blade 26 out of the inner hexagon piece 18B of the quick-connect shaft 18.

The device of the present invention and its components may be made of any suitable materials and may be fabricated by any suitable fabrication process. In some embodiments, to make the device, an injectable mold may be formed, configured for placement of a cable such as MC, BX or AC cable. Two penetrations on the top of the mold may be drilled or integrally molded configured to receive and encase the two pressurized springs and the first and second pins. Portions of the device may also be fabricated by 3D printing or additive manufacturing technologies.

In summary, the present invention provides a compact, portable device configured for attachment to a driver tool such as an impact driver or drill motor, for use to cut metal cladding of an electrical cable without damaging electrical wires thereunder, when used properly. The device comprises a cross member, a housing, an intermediary component held under tension in the housing, and a small saw blade. An electrical cable may be held in an intermediary component cable channel by a pair of spring pins extending downwardly from the cross member into the channel in response to downward manual pressure to the cross member by a user. The intermediary component and the housing are configured to permit vertical sliding movement of the saw blade in response to application of upward manual pressure to the housing by a user. As the bottom of the tool is compressed manually, a portion of the saw blade is permitted to enter the channel through a channel bottom slit to cut the cladding.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A quick-connect device configured for attachment to an impact driver or a drill motor for use to cut a metal cladding of an electrical cable without damaging any electrical wire of the electrical cable located beneath the metal cladding when used properly, the device comprising:
   a cross member having a cross member upper surface and a cross member lower surface, the cross member further comprising a first pin extending downwardly from the cross member lower surface and a second pin extending downwardly from the cross member lower surface;
   a housing comprising a housing body having a housing base, at least one side wall, and a housing interior;
   an intermediary component having an intermediary component lower portion and an intermediary component upper portion, wherein:
      the intermediary component lower portion is constructed and arranged to mate with the housing, the intermediary component lower portion further comprising:
         an intermediary component lower portion surface, further comprising an intermediary component bottom surface and an intermediary component side surface;
         a pair of oval-shaped slots located in the intermediary component side surface, shaped to mate with a pair of interior housing protrusions to retain the intermediary component in the housing; and
         an intermediary component tread; and
      the intermediary component upper portion has an intermediary component top surface and further comprises:
         an axial cable channel configured to receive an electrical cable, the cable channel having a C-shaped cross section, the cable channel comprising a cable channel top, a cable channel bottom and a cable channel bottom slit;
         a first transverse cylindrical pin channel and a second transverse cylindrical pin channel extending downwardly from the intermediary component top surface through the cable channel top; wherein the cross member is spring mounted to the cable channel top;
   wherein the first pin and the second pin are respectively mounted and spring loaded in the first pin channel and the second pin channel, for reciprocating movement of the cross member in response to manual downward pressure applied to the upper surface of the cross member;
   a saw blade rotatably mounted on a bearing operably connected to the intermediary component tread in the housing and configured for movement in the intermediary component lower portion for access to the metal cladding of the electrical cable located in the cable channel through the cable channel bottom slit;
   a quick-connect shaft mounted to the housing operably connected to the intermediary component tread and the saw blade, the quick-connect shaft being further configured for secure removable attachment of the device to an impact driver or a drill motor;
   wherein in use, the device may be securely removably attached to an impact driver or drill motor by the quick-connect shaft for use to cut through the metal cladding; and
   wherein in response to the application of manual pressure to the upper cross member, the upper cross member drives the first pin and the second pin through the first pin channel and the second pin channel respectively, so the first pin and second pin abut the exterior surface of the electrical cable to retain and immobilize the electrical cable in the cable channel;
   whereby when the device is used properly, the saw blade is capable of being selectively actuated by a user by operating the impact driver or drill motor to cut through the metal cladding of the electrical cable a predetermined depth equal to a thickness of the metal cladding without damaging any electrical wires of the electrical cable thereunder.

2. The device of claim 1 wherein the housing is spring-biased with respect to the intermediary component lower portion, the device further comprising a pair of interior housing springs configured to respectively extend between an interior surface of the housing base and a pair of spring-receiving cavities provided in a lower surface of the intermediary component, the pair of interior housing springs maintaining a constant spring tension between the housing and the intermediary component, wherein the constant spring tension further maintains alignment of the pair of interior housing protrusions and the pair of oval-shaped slots of the intermediary component.

3. The device of claim 2 wherein the pair of oval-shaped slots of the intermediary component lower portion are constructed and arranged to permit vertical movement of the pair of interior housing protrusions therein, thereby permitting vertical movement of the housing relative to the intermediary component lower portion in response to compression of the pair of interior housing springs by applying manual pressure to the housing base; wherein the vertical movement of the housing is limited by the movement of the pair of interior housing protrusions in the pair of oval-shaped slots.

4. The device of claim 3 wherein when the device is not in use, the saw blade is located within the intermediary component lower portion.

5. The device of claim 4 wherein selectively actuating the saw blade further comprises applying manual pressure to the housing base to compress the pair of interior housing springs in order to advance the saw blade from a saw blade lower position in which the saw blade is located within the intermediary component lower portion to a saw blade raised position in which a portion of the saw blade is exposed through the cable channel bottom slit.

6. The device of claim 5 wherein when the device is used properly, the saw blade may be actuated by a brief press and release of a trigger of the impact drill or the drill motor, resulting in rotation of the saw blade and cutting of the metal cladding without damaging any electrical wires therebeneath.

7. The device of claim 6 wherein the quick-connect shaft operably connected to the saw blade further comprises a quick-release chuck configured for attachment to the impact driver or drill motor.

8. The device of claim 7 wherein the saw blade is mounted on a saw blade shaft rotatably mounted on the bearing, and wherein during use of the device, the saw blade shaft is configured to rotate on the bearing.

9. The device of claim 8 wherein the first pin and the second pin are attached to the cross member.

10. The device of claim 9 wherein the first pin and the second pin each further comprise a distal pin tip constructed and arranged to contact the exterior surface of the electrical cable located in the cable channel when manual pressure is applied to the uppermost cross member.

* * * * *